United States Patent [19]

Hillmann

[11] 4,412,107

[45] Oct. 25, 1983

[54] ELECTRICAL CONDUCTOR

[75] Inventor: Willi Hillmann, Kamen, Fed. Rep. of Germany

[73] Assignee: Paul Vahle GmbH & Co. KG, Kamen, Fed. Rep. of Germany

[21] Appl. No.: 281,642

[22] Filed: Jul. 9, 1981

[30] Foreign Application Priority Data

Jul. 9, 1980 [DE] Fed. Rep. of Germany ... 8018414[U]

[51] Int. Cl.³ .............................................. B60M 1/34
[52] U.S. Cl. .................................... 191/23 A; 191/30; 339/22 T
[58] Field of Search ..................... 191/23 R, 23 A, 30, 191/48; 339/21 R, 21 S, 22 R, 22 T

[56] References Cited

U.S. PATENT DOCUMENTS 3,995,725 12/1976 Howell ............................. 191/23 A
4,227,596 10/1980 Bartels .............................. 191/23 A

FOREIGN PATENT DOCUMENTS 2730929 1/1979 Fed. Rep. of Germany ........ 191/30

Primary Examiner—Richard A. Schacher
Attorney, Agent, or Firm—Max Fogiel

[57] ABSTRACT

An elongated rail conductor has a rail formed with a groove for a current take-off, and a synthetic plastic housing which surrounds the rail but leaves access to the groove. The edge faces bounding the groove are inwardly offset from the corresponding edges of the casing, so that the moving current take-off cannot contact and wear the edges of the casing.

5 Claims, 1 Drawing Figure

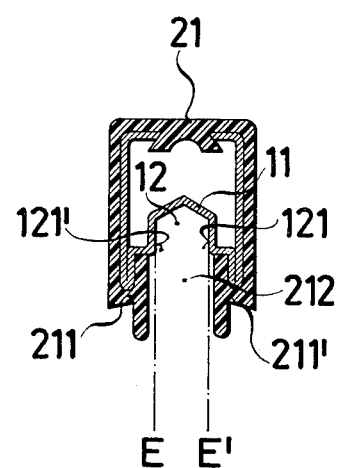

ELECTRICAL CONDUCTOR

BACKGROUND OF THE INVENTION

The present invention relates to an electrical conductor.

More particularly, the invention relates to an insulated electrical conductor.

Still more specifically, the invention relates to an insulated electrically conductive rail especially for rail vehicles.

Insulated electrically conductive rails in general are known. They are provided with a synthetic plastic casing of generally U-shaped profile, the two lateral edges of which engage behind, and are thus retained on, the actual electrically conductive rail. A problem with these known constructions is that the two lateral edges project into the range of the guide track for the current take-off member which slides in the guide track. This means that all or part of the take-off tends to run into these lateral edges of the plastic casing, especially when the vehicle carrying the take-off passes through a curve. As a result, the parts involved are subject to very rapid wear, which is particularly true of the type of electrical guide rail that is provided with anti-touch protection to avoid accidental contact with children or other persons.

SUMMARY OF THE INVENTION

It is an object of the present invention to overcome the problems of the prior art.

A more particular object of the invention is to provide an improved insulated current-conductive rail, which is not possessed of the aforementioned disadvantages of the prior art.

In keeping with these and other objects, one feature of the invention resides in an electrically conductive rail which may, briefly stated, comprise an elongated electrically conductive rail formed with a longitudinally extending track for a current take-off; the track being bounded by two lateral faces and an electrically insulating casing surrounding the rail and having lateral edge portions engaging the rail but permitting access to the track; the lateral faces being located in respective planes which are inwardly offset relative to the edge portions to avoid contact of the latter with a current take-off moving in the track.

The invention will hereafter be described with reference to an exemplary embodiment, as illustrated in the appended drawing. However, it should be clearly understood that this is for purposes of explanation only, and that no limitation is intended to this embodiment.

BRIEF DESCRIPTION OF THE DRAWING

The single FIGURE is a cross-section through an embodiment of the invention.

DESCRIPTION OF THE PREFERRED EMBODIMENTS

Shown in the FIGURE is an electrically conductive rail which may be formed of sheet metal of appropriate thickness. It is installed in a generally U-shaped casing 21 of synthetic plastic material (any of those known from the prior-art casings are suitable); the casing 21 has inwardly projecting edge portions 211, 211' which extend behind and retain the conducting rail 11.

The conductor rail 11 is formed with a guide track or groove 12 in which a (not illustrated) current take-off member can travel lengthwise of the rail. According to the invention, the lateral faces 121, 121' bounding this guide track are located further inwardly than the edge portions 211, 211', i.e. they are located in planes E and E' which are spaced inwardly from the edge portions 211, 211', as the drawing shows.

As a result of this, the current take-off member extending from outside through the slot 212 is no longer able—even when traversing curves or jumping in the track—to come in contact with the edge portions 211, 211'. This eliminates the heretofore so unfavorable and untimely wear of the casing 21, thus increasing the overall service life of the complete rail.

It is clear that the conductive rail 11 need not be of shaped sheet metal, as shown, but could also be of solid cross-section in the manner of a bus bar. Also, the illustrated cross-section of the rail 11 and the casing 21 are not limiting, since others are suitable as well.

The invention has hereinbefore been described with reference to a specific embodiment. However, it is to be understood that the appended claims are not intended to be limited thereto and that all modifications and variations are intended to be embraced by the claims.

What is claimed is:

1. Electrically insulated single pole current-conductive conductor comprising: an elongated electrically conductive rail formed with a longitudinally extending track for a sliding current take-off; said track being bounded by two lateral faces, and an electrically insulating casing surrounding said rail and having lateral edge portions engaging said rail but permitting access to said track by leaving a passage for current take-off, said lateral faces being located in respective planes which are inwardly offset relative to said edge portions to avoid contact of the latter with a current take-off in said track, said lateral edge portions projecting over the current rail in direction of the current take-off, so that the current take-off is prevented from contacting said edge portions to avoid wear of said casing and thereby increase the service life of said rail.

2. A conductor as defined in claim 1, wherein said casing is of synthetic plastic.

3. A conductor as defined in claim 1, wherein said casing is of generally U-shaped cross-section.

4. A conductor as defined in claim 1, wherein said rail is of sheet metal.

5. A conductor as defined in claim 1, wherein said rail is generally U-shaped.

* * * * *